Jan. 19, 1932.  P. McLOUGHLIN  1,842,108
CONNECTING LINK
Filed April 23, 1930

Inventor
Patrick McLoughlin
By Attorneys
Southgate Faye Hawley

Patented Jan. 19, 1932

1,842,108

UNITED STATES PATENT OFFICE

PATRICK McLOUGHLIN, OF WORCESTER, MASSACHUSETTS

CONNECTING LINK

Application filed April 23, 1930. Serial No. 446,705.

This invention relates to a link for use in connecting chains or the like and particularly adapted for connecting cross chains of automobile tires with the side chains or for use as a spare link.

The principal objects of the invention are to provide a simple and inexpensive construction of link which can be introduced between two links in a very simple and expeditious manner; to provide a construction which, when introduced, will be locked therein and will not be likely to be disconnected by any accidental means; and to provide a spring in connection with such a link for accomplishing these purposes which will be of an inexpensive character and will close up the link when it has been connected with the chain and means by which this link will have to be attached only in one place and will be kept from getting out of position.

Other objects and advantages of the invention will appear hereinafter.

Reference is to be had to the accompanying drawings, in which

Figure 1:
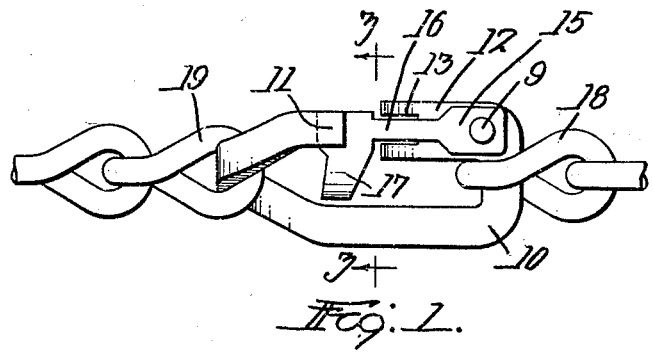
Fig. 1 is a plan of a link constructed in accordance with this invention, shown as used between two links and in place as a part of the chain.

The uses to which such links are put are well known and this link is designed to accomplish the purposes of such links in a more effective manner without adding materially to the expense of the link. In the form shown in Figs. 1, 2 and 3, the link consists of a strip of wire or flat metal 10 of a general C-shape in the form of a rectangle with a triangular end. It will be seen that the one end of the link is in a single plane while the triangular part is bent out of that plane above and below it and constitutes the other end of the link. One longitudinal side of the link is continuous and the opposite side has a gap formed between two ends 11 and 12 of the wire or strip of metal. The end 12 is provided with a notch 13 and the metal on the sides of the notch is bent out of the plane of the link to form two stops 14 on opposite sides of this notch. The two ends 11 and 12 are spaced from each other enough to allow a chain link 18 or 19 to be introduced. The stops 14 are in the same inclined plane as the extreme end 11 preferably.

Riveted to the link 10 at a point 9 near the end of the link is a flat spring 15. This spring has a narrow neck 16 which passes through the notch 13 and, being in the plane of the flat part of the link, it is held between the two stops 14 from any sidewise motion. This does away with any necessity of having two rivets to keep this spring in position. The spring extends straight from the pivot along the end 12 to a point under the end 11. Obviously, as far as this part of the spring is concerned, another link can be introduced into it under the end 11 by pressing it against the spring and forcing the spring back. When the link has been introduced, this spring comes back into flat condition engaging the under side of the end 11 and prevents the chain link from being accidentally disengaged from the link 10.

Figure 2:
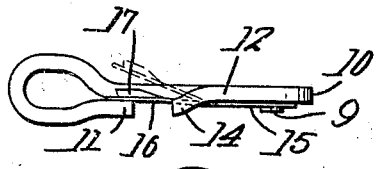
Fig. 2 is an edge view of the same.
Figure 3:
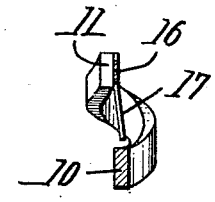
Fig. 3 is a sectional view on the line 3—3 of Fig. 1.

Another feature is shown in these three figures comprising a transverse projection 17 on the spring extending inwardly and across the link 10. This is arranged so that the chain link 18 can be introduced in the same manner as already described and then brought to a position back of the projection 17, as shown in Fig. 1, in which case this link 18 is held back of this projection. Another link 19 can then be introduced under the end 11 and will be held at the opposite end of the link 10. These two links 18 and 19 are then entirely separated from each other and cannot get into any entanglements. The dotted line position in Fig. 2 shows how the spring is bent back when a chain link is introduced.

Figure 4:
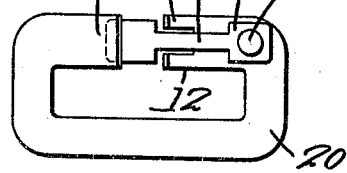
Fig. 4 is a plan of a modified form of this link.
Figure 5:
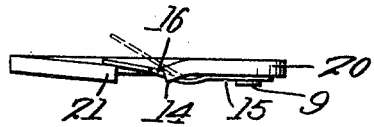
Fig. 5 is an edge view of the same.

In the form shown in Figs. 4 and 5, the parts are the same as previously described except that the link 20 is flat and substantially the same at both ends. The spring 15 has the neck 16 and the end 12 has the stops 14 for the same purpose as in the other case. The end 21 is similar to the end 11 but is flat and in this case not in line with the offset steps 14. The projection 17 is entirely omitted in this case.

Figure 6:
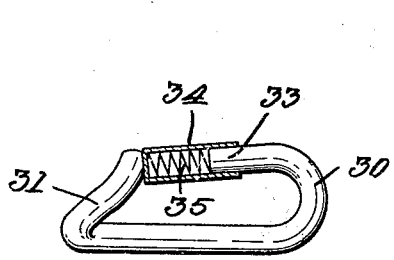
Fig. 6 is a plan, partly in section, showing another modified form.
Figure 7:
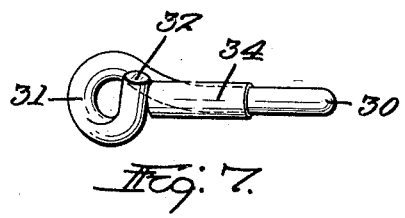
Fig. 7 is an edge view thereof.

In the form shown in Figs. 6 and 7, the result is substantially the same but the construction is different. This is shown as being made of wire instead of flat metal and the link 30 has one end in a plane and the other end 31 bent out of that plane and the extreme end 32 is substantially transverse to it. The end 33 being made of wire is cylindrical and is provided with a cylindrical cup 34 having a spring 35 in it which normally forces the cup up against the end 32. In this case there is no way to introduce the chain link without pulling back the cup by hand but when it is pulled back, the chain link introduced, and the cup released there is no danger of the links being separated by accident. This cup 34 is substantially in the plane of the right hand end of the link as shown.

In all these forms the construction is simple and the expense small to add the spring and associated parts, as the link itself can be made up by simple operations. The spring is applied very simply. There is no danger of the chain links being detached from the connecting link by accident.

Although I have illustrated and described only three forms of the invention, I am aware of the fact that other modifications can be made therein by any person skilled in the art without departing from the scope of the invention as expressed in the claims. Therefore, I do not wish to be limited to all the details of construction herein shown and described, but what I do claims is:—

1. As an article of manufacture, a connecting link comprising a body of metal of C-shape with one end in a plane, the link having a gap across one side, a spring secured to the link near its end on the side having the gap and resting on the surface of that side for a material distance, the metal at that edge of the gap having stops to engage opposite edges of the spring and hold it against turning, and the spring extending across the gap into contact with the other edge of the gap.

2. As an article of manufacture, a connecting link comprising a body of metal in the general shape of a rectangle having a gap across one side, a spring riveted to the link near the end of the link and on the side having the gap and resting on the surface of that side for a material distance beyond the rivet, the side of the link having a notch at its extreme end to receive the spring and having stops bent up from it to engage opposite edges of the spring and hold it against turning about its rivet and the spring extending through the said notch and across the gap into contact with the other end of the link material, for the purpose described.

3. As an article of manufacture, a connecting link for the purpose described comprising a generally rectangular body of metal having one continuous side and one interrupted side, a spring riveted to the interrupted side near the end and extending across the gap, means on the interrupted side for preventing the spring turning about its rivet, and a transverse flat projection on the spring in the plane thereof extending across the link, whereby two chain links can be connected with it and be separated by said projection.

4. As an article of manufacture, a connecting link comprising a body of metal continuous along one side and interrupted on the other with the end bent at right angles to the general plane of the link and spaced from the opposite end, a cup-shaped member slidably mounted on the straight end of the link and a spring in the cup-shaped member normally forcing it against the side surface of said transverse end.

5. As an article of manufacture, a connecting link for the purpose described comprising a generally rectangular body of metal having one continuous side and one interrupted side, a spring extending across the gap, and a transverse projection on the spring in its plane extending across the link, whereby two chain links can be connected with it and be separated by said projection.

In testimony whereof I have hereunto affixed my signature.

PATRICK McLOUGHLIN.